Sept. 6, 1955  R. H. D. ROSIER  2,716,920
DEVICE FOR TAKING MOTION PICTURES IN RELIEF
Filed Dec. 12, 1951

INVENTOR
Raymond Henri Denis Rosier
BY
Cameron, Kerkam & Sutton
ATTORNEYS

United States Patent Office 2,716,920
Patented Sept. 6, 1955

2,716,920

DEVICE FOR TAKING MOTION PICTURES IN RELIEF

Raymond Henri Denis Rosier, Paris, France, assignor to Societe d'Optique et de Mecanique de Haute Precision, Paris, France, a corporation of France Application December 12, 1951, Serial No. 261,340

Claims priority, application France December 13, 1950

1 Claim. (Cl. 88—16.6)

It has been proposed heretofore, in order to obtain cinematographic projections giving the impression of relief or solidity, to make simultaneously two stereoscopic photographs eventually juxtaposed on the same film and to project the two images simultaneously on a screen so that they are superimposed in such a manner that they blend sensibly with one another, but after they have undergone a suitable polarization which is applied thereto by providing each of the two projection lenses with a polarizing filter, the two filters being oriented perpendicularly in relation to one another. When the images thus thrown on the screen are observed through glasses which are also provided with properly oriented polarizing filters, each eye sees only one image and the spectator has the sensation of relief or of viewing a three dimensional object.

For the taking of stereoscopic photographs of this character, it has been proposed to utilize two lenses spaced from one another at a distance equal to the stereoscopic spacing, i. e., the approximate distance apart of the human eyes, which is on the order of 65 mm., and to then reduce this spacing of the two pencils of light rays traversing the lenses, in order to enable juxtaposition of the two images on the same film, to the spacing prescribed by the width of said film by means of prisms or reflecting mirrors disposed between the film and the lenses.

However, this solution of the problem cannot be realized in practice in the manner proposed because the necessity for departing from the stereoscopic spacing would require, in order to place the two images on the same film, that the lenses be given a focal length incompatible with a sufficiently wide field.

The object of the present invention is to provide a device which permits the taking of correct stereoscopic photographs while fully enjoying the advantage of a satisfactory angular field.

To this end, the two objective lenses or lens systems of the device in question are disposed with their axes parallel to one another at a spacing intermediate the stereoscopic spacing and that of the two images which are to be obtained on the film, the stereoscopic spacing of the two pencils of light rays utilized being reduced first to that of the lenses by a pair of afocal systems including reflecting devices such as rhombic prisms or diamond shaped mirrors, and then from the spacing of the lenses to that of the images with the aid of a second set of reflecting devices.

The reflecting devices intercalated between the lenses of the afocal systems can also be supplemented, if desired, by rectifying prisms so that, due to the 90° rotation which is applied thereby, the two stereoscopic images may assume on the film, without changing the dimensions of the latter, a position which permits them to have the usual proportions, i. e., less height than width, and thereby makes it possible to use at the time of restitution, after rectification, a screen of the usual form, i. e., one which is wider than it is high.

For the projection of stereoscopic images in accordance with the invention, two lenses or lens systems are used which are disposed parallel to one another at a spacing equal to that of the two images on the film. When necessary, i. e., when the images have been turned 90° on the film, there is also provided in the projection lens system a complementary arrangement of rectifying prisms.

One embodiment of a device conforming to the invention has been illustrated in the accompanying drawing and is hereinafter described.

Figure 1:
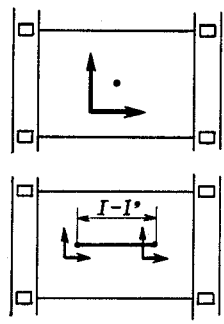
Fig. 1 is a schematic showing of two fragments of motion picture film illustrating one example of the distribution of stereoscopic images on a film normally intended to receive a single image.

The diagram of Fig. 1 shows how, on a film which is normally intended to receive images occupying its entire width, it is possible to dispose side by side two series of images having the same dimensions, the geometrical centers of these images being spaced from one another a distance I—I' equal to one-half the width of the usual image.

Figure 2:
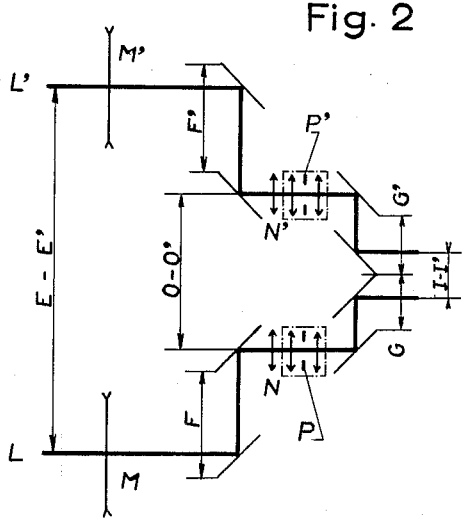
Fig. 2 is a diagram of the assembly of an optical device for taking stereoscopic photographs in accordance with the invention.

On the other hand, the taking of stereoscopic photographs necessitates a spacing of the pencils of light rays on the order of 65 mm., indicated at E—E' in Fig. 2, which latter figure shows how the two pencils of rays L and L' are brought together or reduced first to a spacing O—O' with the aid of reflecting systems F and F', and then to the spacing I—I' with the aid of reflecting systems G and G'. All of these reflecting systems may consist of rhombic prisms or diamond shaped mirrors.

The spacing O—O' in Fig. 2 is that of the two photographic objective lenses or lens systems P and P' which are mounted parallel to and almost in contact with one another, and each of which includes an iris diaphragm. The close mounting of these lenses permits a reduction of space in the optical system and the easy fitting together of the several adjusting parts. The assembly thus formed is adapted to be screwed onto the camera in place of an ordinary objective lens.

The spacing O—O', which is determined by the diametral dimensions of the two objectives P and P', will not give, however, with acceptacle focal distances, a sufficient angular field comparable to that of a single objective. In order to obtain this desired angular field, each of the reflecting systems F and F', which reduce the spacing between the light rays L and L' from the stereoscopic spacing E—E' to the spacing O—O' of the lenses, is intercalated between the lenses M and N, or M' and N', respectively, of an afocal system which, by reducing in a suitable manner the focal distance of the corresponding objective lens without diminishing the distance of the image from the last surface of the objective, gives this lens the field normally adopted for the size of film used.

It is evident that the lenses N and N' of the two afocal systems could be incorporated in the corresponding objectives P and P', if desired.

Figure 3:
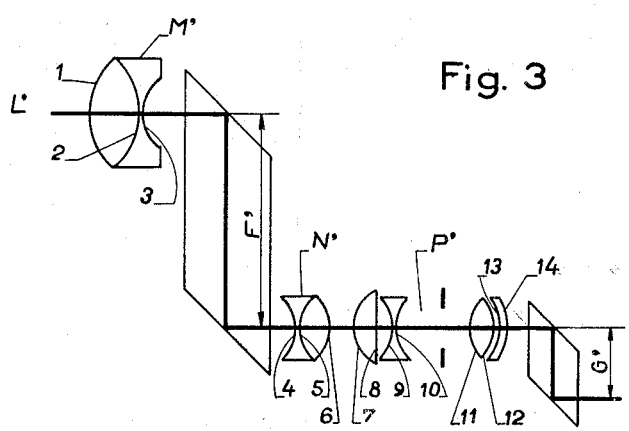
Fig. 3 is a schematic showing of one embodiment of one of the two optical systems of the device of Fig. 2.

In Fig. 3 there is shown the organization of one of the two identical optical systems of the above described device. In this figure, which indicates the form of lenses making up the afocal system M', N' and the objective P' shown diagrammatically in Fig. 2, the reference characters 1, 2, 3 . . . 14 designate the front and rear faces of the various lenses.

Figure 4:
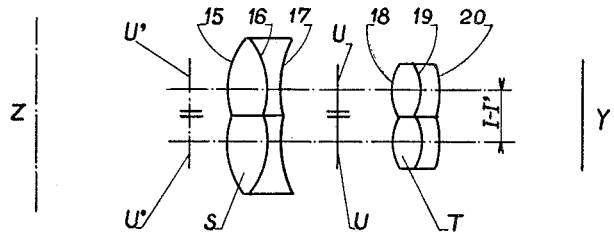
Fig. 4 is a diagrammatic showing of one form of optical means for projecting images in accordance with the invention.

For the simultaneous projection of double images which have been obtained on one film by the device of Fig. 2, a double objective lens is utilized comprising, as shown in Fig. 4, two single objectives mounted parallel in the same mounting with a spacing I—I' between their focal axes, each objective comprising a lens S having faces 15, 16 and 17 and a lens T having faces 18, 19 and 20. The corresponding lenses of the two objectives may be desegmented, i. e. may have segments removed or cut off from their adjacent edges, so as to permit the parallel lens axes to be brought closer together and provide a plane surface of reciprocal contact between the lenses. Between the lenses S and T of each of the two objectives is disposed a polarizing filter U, the two filters being oriented perpendicularly to one another. If desired, these filters may be disposed in front of lens S, as indicated at U', instead of between the lenses.

The screen Z on which the images are projected is metalized in order that the polarization may operate; it is also possible, however, to use a frosted glass screen, in which event the projection is effected from the rear, i. e., by transparency. As is well understood, the spectators must observe the projected images through glasses which are also provided with polarizing filters oriented perpendicularly to one another so that each eye sees only one of the two images which are projected simultaneously on the screen.

In order to illustrate how the invention may be applied in practice, the following table sets forth the calculated characteristics of the elements of the optical systems of Figs. 3 and 4 as they might be employed with a 16 mm. film, for example. In this table:

R is the radius of curvature of the lens face in millimeters.
$e$ is the thickness in millimeters of the lens bounded by, or the air space between, the faces indicated.
$n_D$ is the index of refraction of the lens glass.
$v$ is the index of dispersion of the lens glass.

*Afocal system*

| Lens Face | R | $e$ | $n_D$ | $v$ |
| --- | --- | --- | --- | --- |
| 1 | +184.6 | 3.2 | 1.67510 | 32.3 |
| 2 | −50.85 | 1.9 | 1.51047 | 64.0 |
| 3 | +18.615 | | | |

Distance between reflecting sides of rhomb F'—24 mm.

| | | | | |
| --- | --- | --- | --- | --- |
| 4 | −91.6 | 1.9 | 1.67510 | 32.3 |
| 5 | +304.4 | 3.2 | 1.51047 | 64.0 |
| 6 | −29.120 | | | |

*Photographic objective*

| Lens Face | R | $e$ | $n_D$ | $v$ |
| --- | --- | --- | --- | --- |
| 7 | +13.3 | 3.0 | 1.62111 | 57.0 |
| 8 | −350.0 | 1.2 | | |
| 9 | −48.0 | 1.0 | 1.61413 | 37.0 |
| 10 | +17.0 | 8.0 | | |
| 11 | +45.0 | 2.3 | 1.62111 | 57.0 |
| 12 | −18.0 | 0.7 | | |
| 13 | −13.0 | 1.0 | 1.61413 | 37.0 |
| 14 | −25.0 | | | |

Distance between reflecting sides of rhomb G'—7.8 mm.

*Projection objective*

| Lens Face | R | $e$ | $n_D$ | $v$ |
| --- | --- | --- | --- | --- |
| 15 | +32.0 | 6.3 | 1.567 | 53.0 |
| 16 | −29.0 | 2.0 | 1.653 | 33.0 |
| 17 | +410.0 | 30.0 | | |
| 18 | +19.0 | 5.2 | 1.574 | 57.0 |
| 19 | −15.0 | 1.4 | 1.653 | 33.0 |
| 20 | −160.0 | | | |

The embodiment of the invention above described may be modified in various respects, or supplemented by any suitable accessory parts, without departing from the inventive concept. Furthermore, it is evident that the invention is not limited to the use of black and white films, but is applicable without change to color cinematography. Finally, in addition to its use for taking stereoscopic photographs with an angular field equal to that normally adopted in cinematography, the device of the invention can also be applied, for special purposes, to obtain stereoscopic photographs with a reduced angular field less than that provided by the objective lenses alone by simply inverting in each of the two afocal systems the two lenses which comprise it.

Although only one specific form of the invention has been described and illustrated in the accompanying drawing, it will be obvious that the invention is not confined to the particular device shown but is capable of a variety of mechanical embodiments. Reference is therefore to be had to the appended claim for a definition of the limits of the invention.

What is claimed is:

A stereoscopic photographic device adapted to replace the normal single objective of an ordinary camera and to obtain two images of the object photographed juxtaposed on the same film with a spacing between their geometrical centers equal to one-half the width of the normal single image, comprising a pair of objectives having parallel axes spaced apart a distance intermediate the stereoscopic spacing and the spacing of the two images on the film, a pair of rhombic prisms at the rear of said objectives for reducing the spacing between parallel light beams issuing from the objectives to that of the images on the film, and an afocal lens system in front of each objective providing a field of the same size as that of the normal single objective, said afocal lens systems including lenses having stereoscopically spaced axes and reflecting means for reducing the spacing of light beams issuing from said lenses from the stereoscopic spacing to the spacing of the axes of said pair of objective.

References Cited in the file of this patent

UNITED STATES PATENTS

| | | |
| --- | --- | --- |
| 1,550,214 | Leonard | Aug. 18, 1925 |
| 1,815,208 | Moraz | July 21, 1931 |
| 1,851,705 | Herz | Mar. 29, 1932 |
| 1,909,222 | Pettie | May 16, 1933 |
| 2,268,712 | Luer et al. | Jan. 6, 1942 |
| 2,304,724 | Austin | Dec. 8, 1942 |
| 2,313,561 | Mainardi et al. | Mar. 3, 1943 |
| 2,441,674 | Savoye | May 18, 1948 |
| 2,460,864 | Whiteley | Feb. 8, 1949 |
| 2,627,201 | Baker | Feb. 3, 1953 |

FOREIGN PATENTS

| | | |
| --- | --- | --- |
| 346,679 | Great Britain | Apr. 10, 1931 |
| 649,777 | Great Britain | Jan. 31, 1951 |